United States Patent Office 3,135,696
Patented June 2, 1964

3,135,696
PROCESS FOR THE PREPARATION OF ALUMINUM OXIDE AND CARBON BASED BRIQUETTES
Louis Ruelle and Jacques Clair, Grenoble, France, assignors to Pechiney Compagnie de Produits Chimiques et Electrometallurgiques, Paris, France
No Drawing. Filed Sept. 1, 1960, Ser. No. 53,339
Claims priority, application France Sept. 3, 1959
6 Claims. (Cl. 252—182)

This invention relates to briquettes of aluminum oxide and carbon and to a method for preparation of same.

It is an object of this invention to produce and to provide a method for producing briquettes formed essentially of aluminum oxide and carbon in intimate contact, one with the other, wherein the elements are present in a highly reactive state and wherein the aluminum oxide and carbon are present in about the stoichiometric ratio for reaction to reduce the oxide with carbon.

Another object is to provide a process for the agglomeration of powdered aluminum oxide and carbon to form briquettes characterized by a high degree of porosity for remaining pervious to gases such as nitrogen, air, chlorine and the like and which is simultaneously characterized by strength and dimensional stability to resist breakdown under load and/or temperature.

A further object is to produce briquettes formed substantially of aluminum oxide and carbon which briquettes possess high strength and resistance to deterioration upon exposure to temperatures ranging from ambient temperature to temperature in excess of 1800° C. without undergoing excessive amounts of fusion or sintering which might otherwise detract from the porosity of the briquettes or cause the formation of larger agglomerates which would make utilization more difficult.

Other objects and advantages of this invention will hereinafter appear from the following description.

In accordance with the practice of this invention, porous briquettes of aluminum oxide and carbon are formed by the admixture of aluminum oxide and carbon in the form of powders to bring the aluminum oxide and carbon into proper distribution and by wetting the mixture with an aqueous solution of a strong alkali to form a paste which can be granulated and dried.

In the practice of this invention, the aluminum oxide and the carbon are utilized in the form of a fine powder having a grain size of about 150 microns or less. The aluminum oxide is provided in a relatively pure state, such as in the form of corundum, or otherwise prepared by known processes, such as the "Bayer" process. As the carbon, use can be made of charcoal, petroleum coke (either raw or calcined), chemically purified coals, cokified carbohydrates and the like. For use in preparing the alkaline solution, use can be made of sodium or potassium hydroxide, in amounts to provide a concentrated solution in aqueous medium containing up to several hundred grams of such alkaline metal hydroxide per liter, and preferably in an amount ranging from about 200 to 400 grams per liter. Instead of an alkaline metal hydroxide, use can be made of solutions of alkaline aluminates, such for example as aqueous solutions of sodium or potassium aluminate, present in an amount to provide a concentrated or saturated solution.

The amount of alkaline solution incorporated with the mixture of dry powders of aluminum oxide and carbon can range from a few percent to some ten percent, for example between 3 to 30 percent by weight, and more desirably between 5 to 20 percent by weight, and preferably of the order of 10 to 15 percent by weight solution based upon the amount of dry solids.

Briefly described, in the practice of this invention, the powder of aluminum oxide and carbon are combined in a homogeneous mixture by conventional mixing equipment well known to the art, and the materials mixed in the desired proportion are introduced in a kneader or other dough or paste mixing machine, as represented by a conventional piece of equipment referred to in the trade as a "pill-box," formed of a granulation disc or drum sloping on its axis at an angle of about 30° to 60° with respect to the horizontal position and about which it is slowly pivoted.

The strongly alkaline solution is introduced simultaneously with the homogeneous mixture of aluminum oxide and carbon in the proportions previously described. The size of the briquettes or granules formed will depend somewhat upon the time of granulation and the characteristics of the granulator. For example, with a unit of the type described having a diameter of 2 meters and a height of 80 centimeters and mounted at a slope of 30° with the horizontal for rotation at a velocity of about 16 r.p.m., aluminum oxide and carbon introduced in powdered form will require about one to three hours to produce granules of about 10 millimeters average diameter, about one to four hours to produce granules of about 15 millimeters, and about one to six hours for granules of about 20 millimeters in diameter.

Thereafter, the granules that are formed of the paste can be dried, preferably at elevated temperature such as within the range of 100° to 200° C. at normal pressure or under vacuum or combinations thereof, for the removal of volatilizable material to produce porous granules or briquettes having excellent resistance to the forces of abrasion. They can be subjected to compressive stresses in the order of 60 to 110 kilograms without excessive breakdown.

Such briquettes can be utilized, among other things, in any reaction system embodying the reduction of aluminum oxide by carbon, such for example as in the preparation of aluminum nitride, aluminum carbide, aluminum halide, etc. Briquettes prepared in accordance with the practice of this invention can be utilized in such reactions without introduction of objectionable impurities which might otherwise interfere with the course of the reaction or the character of the product that is secured. Thus in nitriding such briquettes by reaction with nitrogen, as in the process described in copending application, Ser. No. 671,890, filed July 15, 1957, now United States Patent No. 2,962,359, a product is obtained in the form of briquettes containing 98.5 or more percent aluminum nitride, especially when use is made of aqueous liquors saturated with sodium or potassium aluminate as the alkaline solution with which the powders of aluminum oxide and carbon are combined in forming the paste of which the granules are originally formed.

The following examples are given by way of illustration but not by way of limitation of the present invention.

*Example 1*

100 kilograms of aluminum oxide in the form of blown corundum and 47 kilograms of pure calcined petroleum coke, both of which are in finely divided form of less than 150 microns, are thoroughly mixed by kneading for about one half hour.

The mixture is introduced continuously into a granulation disc of the type previously described at the rate of about 50 kilograms per hour, as by means of a vibratory feed embodying means for adjusting to feed rate. An aqueous solution of sodium aluminate is simultaneously introduced at a rate of about 5.5 liters per hour, the solution having a density of about 1.45 and containing 237 grams $Al_2O_3$ per liter and 261 grams $N_2O$ per liter.

The mixture is continuously kneaded in the presence of said solution for about two and a half hours and formed into granules having an average density of about 1.25 and an average mean diameter of about 15 millimeters.

The granules are dried for ten hours at 170° C. to form porous briquettes having an average density of about 1.23 gr./cm. and containing less than 0.5 percent water by weight.

*Example 2*

50 kilograms per hour of a mixture of aluminum oxide and carbon, similar to the mixture defined in Example 1, are treated with 5 liters per hour of an aqueous solution containing 400 grams of sodium hydroxide per liter. The composition is processed in accordance with Example 1 to produce briquettes similar to those produced in Example 1 characterized by a high degree of porosity, high strength, and high reactivity.

It will be understood that changes may be made in the details of the formation and the processing steps and equipment without departing from the spirit of the invention, especially as defined in the following claims.

We claim:

1. A process for the preparation of briquettes consisting essentially of aluminum oxide and carbon present in substantially stoichiometric ratio for reducing the aluminum oxide with carbon comprising combining aluminum oxide and carbon having a grain size of not more than about 150 microns in intimate mixture, introducing an aqueous alkaline solution of an alkaline material selected from the group consisting of alkali metal hydroxide and alkali metal aluminate in amounts of from 3 to 30% by weight based upon the amount of dry solids to form a dry paste as distinguished from a wet slurry, granulating the paste, and then drying the granules at a temperature within the range of ambient temperature up to about 200° C. to form porous briquettes of high strength.

2. A process as defined in claim 1 in which the alkali compound is present in the aqueous solution in an amount within the range of 200 to 400 grams per liter.

3. A process as defined in claim 1 in which the amount of aqueous solution introduced into the mixture of powdered aluminum oxide and carbon is within the range of 5 to 20 percent by weight based upon the weight of the mixture.

4. A process as defined in claim 3 in which the amount of solution is within the range of 10 to 15 percent by weight of the mixture.

5. A process for the preparation of briquettes of aluminum oxide and carbon comprising the steps of mixing aluminum oxide and carbon while in a finely divided state of less than 150 microns and in the amount corresponding to about the stoichiometric ratio for reducing aluminum oxide with carbon, introducing an aqueous solution consisting essentially of a solution of an alkaline material selected from the group consisting of an alkali metal hydroxide and an alkali metal aluminate in an amount of 200 to 400 grams per liter and wherein the solution is introduced in an amount corresponding to 5 to 20 percent by weight of the mixture, granulating the composite mixture, and then heating the granules at a temperature of 100° to 200° C. for a time sufficient to remove moisture and harden the granules into structurally strong, relatively incompressible, porous briquettes.

6. A high strength porous briquette comprising aluminum oxide and carbon uniformly admixed one with the other in finely divided form and produced by the process of claim 3.

References Cited in the file of this patent

UNITED STATES PATENTS

| | | |
|---|---|---|
| 2,812,249 | Culberson et al. | Nov. 5, 1957 |
| 2,819,152 | Aagaard | Jan. 7, 1958 |
| 2,956,868 | Burgess | Oct. 18, 1960 |

FOREIGN PATENTS

| | | |
|---|---|---|
| 520,787 | Canada | Jan. 17, 1956 |